United States Patent Office 3,503,042
Patented Mar. 24, 1970

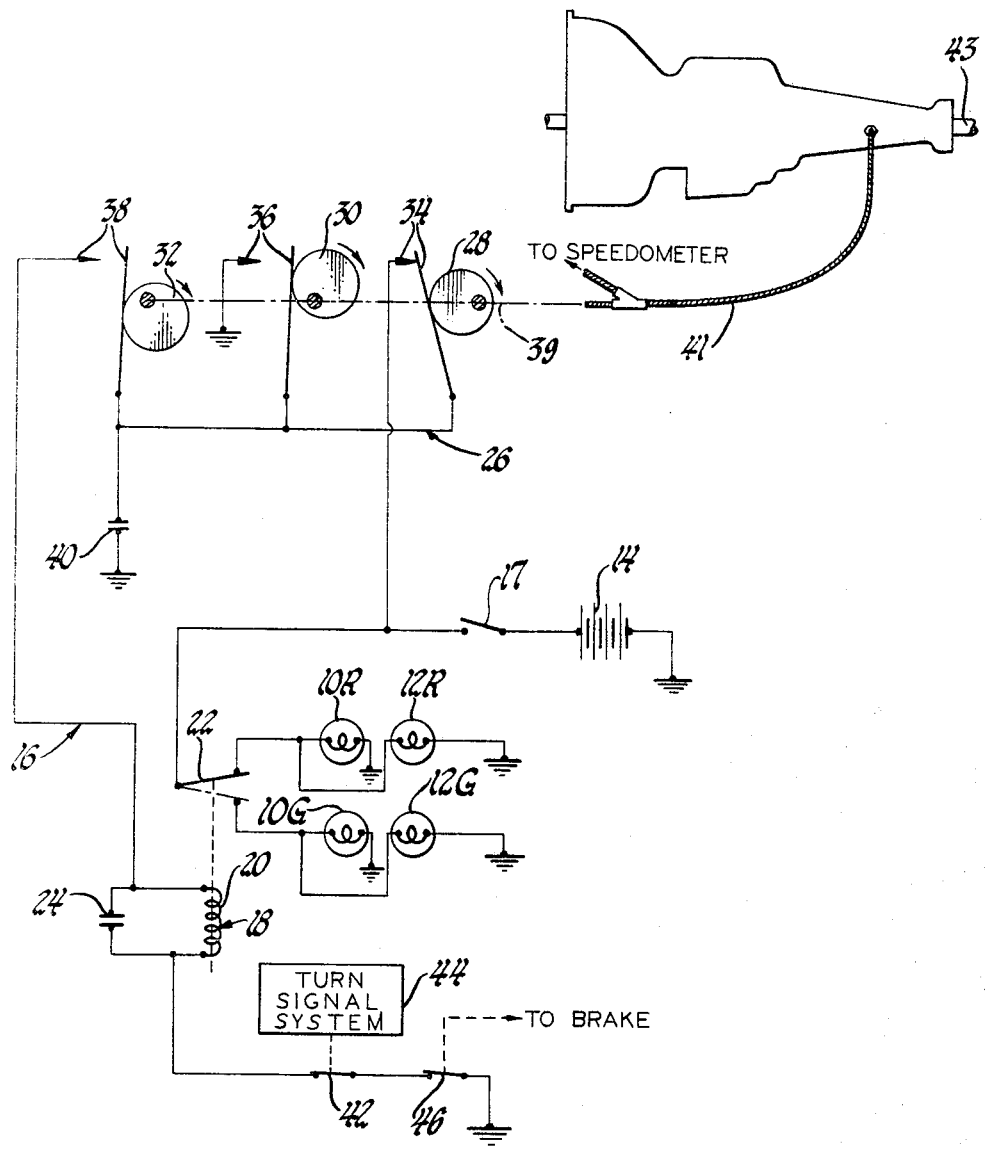

3,503,042
VEHICLE SIGNALING SYSTEMS
Kenneth R. Skinner, Anderson, Ind., assignor to General Motors Corporation, Detroit, Mich., a corporation of Delaware
Filed June 14, 1967, Ser. No. 646,058
Int. Cl. B60q 1/38, 1/22, 1/44
U.S. Cl. 340—67                    5 Claims

ABSTRACT OF THE DISCLOSURE

A vehicle signaling system for illuminating red signal lamps when the vehicle is stopped and green signal lamps when the vehicle is moving forwardly. A motion switch incorporating switch contacts that are sequentially actuated by speedometer-driven cams, charge and discharge a supply capacitor. This supply capacitor then charges a control capacitor, which is arranged in parallel with a relay, and when charged energizes the relay. The relay when energized turns off the red signal lamps and turns on the green signal lamps.

---

This invention relates to an improved vehicle signaling system, and particularly to the type of system that incorporates a vehicle motion responsive switch.

In vehicle signaling systems where vehicle motion is to be signaled, i.e., a stop condition or a moving condition, a device which is responsive to motion must be incorporated in this system. This has been done in various ways. For example, the accelerator pedal when depressed may serve this function in some systems, but no vehicle motion will result if the transmission is in its neutral setting. Therefore, a depressed accelerator pedal would develop an erroneous motion signal when the vehicle is stopped. In some systems, when the vehicle is slowing, a flashing signal is provided by alternately making and breaking switch contacts at a frequency that is related to vehicle speed. Another type of device is made vehicle speed conscious and activates a signal lamp circuit above a certain vehicle speed. These devices are generally operative only in certain speed ranges and thus have limited versatility. Moreover, they do not distinguish between forward and backward movement.

Therefore proposed is a vehicle signaling system that has a positive reaction to vehicle movement, that is responsive to any type and extent of normal vehicle movement, and that discerns between forward and backward movement.

Further contemplated is a unique motion responsive device that responds to movement and its direction, and then develops corresponding outputs.

Also contemplated is a motion responsive device incorporating sequentially actuated switch contacts that first cause an energy storage device to be provided with energy from a source, and next the energy to be supplied either to a load during one direction of movement or returned to the energy source during the opposite direction of movement.

Somewhat more specifically stated, there is proposed a motion switch that has switch contact actuating cams driven at a speed related to vehicle speed and that sequentially actuate the switch contacts to first charge from a source a capacitor, and when vehicle movement is forward to discharge the capacitor to another capacitor, which operates a relay for causing corresponding signal lamp illumination, or when vehicle movement is backward to discharge the capacitor to the source.

By one form of the invention red and green signal lamps are appropriately mounted on a vehicle. These signal lamps are connected to the vehicle battery by a control circuit that includes a relay, with a control capacitor in parallel therewith and a motion switch in series with the control capacitor and the relay. The motion switch includes a series of cam actuated switch contacts that are sequentially opened and closed to charge a supply capacitor from a battery and then discharge the supply capacitor to the control capacitor. The cams are revolved through a connection with the vehicle speedometer and thus, when forward vehicle movement is initiated, the control capacitor is charged. The relay then is energized and the green lamps illuminated. When the vehicle stops or is reversed, there is no charging of the control capacitor and the relay deenergizes so that the red signal lamps are illuminated. The turn signal and the brakes can also be incorporated in the system so that when either the brakes are applied or a turn is indicated the red signal lamps are always illuminated even though the vehicle is in motion.

The foregoing and other objects and advantages of the invention will become apparent from the following description and from the accompanying drawing in which the single figure illustrates schematically a vehicle signaling system incorporating the principles of the invention.

Referring to the drawing, the numerals 10R and 12R designate red signal lamps and the numerals 10G and 12G designate green signal lamps. These lamps may be mounted either at the front or at the rear of the vehicle, or both; preferably, the lamps 10R and 10G on the left side of the vehicle and lamps 12R and 12G on the right side of the vehicle so that there is a set of red and green lamps on each side. The colors of these lamps are for explanatory purposes and are characteristic of the colors used to denote stop and go conditions. Obviously, other colors may be used as may be demanded by the local regulations. Also, the lens may be colored instead of the lamps. These signal lamps 10R, 12R or 10G, 12G are connected to a source of electric energy, such as a conventional vehicle battery 14, by a control circuit, assigned the numeral 16, when a lamp switch 17 is closed. The battery 14 is assumed to operate in the usual voltage regulated twelve-volt system and have its negative terminal connected to the vehicle frame (not shown) which provides the low potential or ground return for the various circuits. As will be explained more in detail, this control circuit 16 operates to cause the red lamps 10R and 12R to be illuminated when the vehicle is stopped and the green signal lamps 10G and 12G to be illuminated when the vehicle is moving.

The control circuit 16 extends from the high potential side of the battery 14 to the low or ground potential side and includes a relay, denoted generally at 18. This relay has a winding 20 and an armature 22 that connects the battery 14 in the depicted solid line deenergized position to the red signal lamps 10R and 12R, and in the illustrated broken line energized position to the green signal lamps 10G and 12G. Current flow is, therefore, from the high potential side of the battery 14 through the signal lamps and then via the ground connection back to the battery 14.

The energizing energy for the relay 18 is developed by an energy storage device, such as a control capacitor 24, which is connected in parallel with the winding 20. When the control capacitor 24 is charged to the energizing potential for the relay 18, the armature 22 will be moved to its broken line energized position.

The charging of the control capacitor 24 is the function of a vehicle motion responsive device, such as a motion switch, depicted generally at 26. This motion switch 26 has a series of cams, which will be referred to as an input cam 28, a reverse output cam 30 and a forward output cam 32, each actuating a set of switch contacts. These switch contacts are designated as input switch contacts 34, reverse output switch contacts 36 and forward output switch contacts 38. The cams 28, 30 and 32 are each drive-connected to a shaft 39, which may be suitably drive-connected either to a conventional speedometer cable mechanism 41, to some part of the speedometer, separately connected to a transmission output shaft, illustrated at 43, or some other part of the vehicle power train. The mode of driving the shaft 39 will be determined by the application and availability of the particular drive. The important thing is that whenever the vehicle wheels revolve, either forwards or backwards, the drive shaft 39 and the cams 28, 30 and 32 are correspondingly revolved.

The angular position of the high side of the cams 28, 30 and 32, or the side opposite the part of the cams 28, 30 and 32 that is drive-connected to the shaft 39, is selected so that the required sequential switching occurs. For example, with the input cam 28 having its high side as illustrated and with its forward rotation being clockwise, or in the direction of the arrows, the adjacent reverse output cam 30 has its high side displaced 120° from that of the input cam 28 and the forward output cam 32 has its high side displaced 120° from that of the reverse output cam 30. Thus, in the depicted position of the input cam 28 its input switch contacts 34 will connect the battery 14 to an energy storage device; e.g., a supply capacitor 40. When the cams 28, 30 and 32 are rotated 120° clockwise, the input switch contacts 34 will open and the forward output switch contacts 38 will close. These closed forward output switch contacts 38 connect the supply capacitor 40 in parallel with the control capacitor 24 for the relay 18. Assuming for exemplary purposes that the supply and control capacitors have respectively rated capacitances of 500 and 1,000 microfarads, and further that the relay winding 20 presents a 410 ohm resistance, part of the charge on the supply capacitor 40 will be transferred to the control capacitor 24. After another 120° rotation of the cams 28, 30 and 32, the reverse output cam will close its switch contacts 36 while both the input switch contacts 34 and the forward output switch contacts 38 will be open. Hence, the connecting of the supply capacitor 40 by way of the first output switch contacts 36 to the low potential side of the battery 14 will complete the discharge of the supply capacitor 40 and one cycle of the motion switch 26, assuming that all of the charge in the time permitted is not transferred to the control capacitor 24. Actually, with the suggested capacitances, about three cycles of charging the control capacitor 24 are required to develop the approximately seven volt energizing potential needed across the relay winding 20 for actuating the relay 18 and illuminating the green signal lamps 10G and 12G.

When the motion of the vehicle is reversed, the sequence of operation of the motion switch 26 is changed. Now the cams 28, 30 and 32 will revolve counterclockwise or in the direction opposite of that shown by the arrows. Hence, starting with the input cam 28 in its illustrated position, with its input switch contacts 34 closed, the supply capacitor 40 will be connected to the battery 14 and commence to charge. After 120° rotation backwards, the input switch contacts 34 will open, the forward output switch contacts 38 will remain open, and the reverse output cam 30 will rotate so as to close its reverse output switch contacts 36. The circuit is now completed from the supply capacitor 40 through the reverse output switch contacts 36 to ground and back to the low potential side of the battery 14. The next 120° rotation backwards will close the forward output switch contacts 38, while the other switch contacts 34 and 36 remain open. Since there will be no charge remaining on the supply capacitor 40, the control capacitor 24 will not be charged. This cycle repeats in the reverse direction, but without the control capacitor 24 being charged. Consequently, the relay 18 will remain in or revert to its deenergized solid line position and the red signal lamps 10R and 12R will illuminate whenever the vehicle moves in the reverse direction.

Also incorporated in the control circuit 16 is a turn signal switch 42 that is connected to a conventional turn signal system 44 in such a way that when a turn is indicated the turn signal switch 42 is opened. In series with this turn signal switch 42 is a brake switch 46 that is connected in any appropriate way with the vehicle brake so that when the vehicle brakes are applied this brake switch 46 is also opened. These switches 42 and 46 can be connected into the control circuit 16 in other ways as will readily occur to those versed in the art. For example, the high potential side of the battery 14 could be connected to the ground side of the relay 18 so that the required difference in potential for energization could not be developed. As can be appreciated, with either of these switches 42 or 46 opened the control circuit 16 is opened or interrupted and the control capacitor 24 is, in effect, disconnected from the motion switch 26. Therefore, regardless of the motion of the vehicle, the relay 18 cannot be energized and the red signal lamps 10R and 12R will be illuminated. Any charge on the control capacitor 24 when either of the switches 42 or 46 is opened will be dissipated after a short delay through the relay winding 20.

Briefly summarizing the operation, when the vehicle is stopped, the motion switch 26 is inoperative and no charge is applied to the control capacitor 24. Any charge remaining on the control capacitor 24 will be dissipated through the relay winding 20, and the relay 18 will deenergize so that its armature 22 is returned to the solid line position and the red signal lamps 10R and 12R are illuminated. When the vehicle commences to move forwardly, the motion switch 26 becomes operative and the sequential opening and closing of the contacts 34, 36 and 38 commences so that the supply capacitor 40 receives a charge for each cycle of opening and closing of the input switch contacts 34 and the forward output switch contacts 38. The control capacitor 24, being in parallel with the supply capacitor 40 and having a greater capacitance, will be charged by the supply capacitor 40 until the charge on the control capacitor 24 builds up to the suggested seven volt potential required to energize the relay 18 and move the armature 22 to the broken line position in which the green signal lamps 10G and 12G are illuminated. If during this forward motion a turn is indicated, the turn signal switch system 44 will become operative and open the turn signal switch 42. This opens or breaks the control circuit 16. With an opened control circuit 16 the relay 18 cannot be energized and the red signal lamps 10R and 12R are illuminated. The same condition occurs when the brakes are applied, for the brake switch 46 opens to open the control circuit 16 and, therefore, causes the red signal lamps 10R and 12R to be illuminated.

When the vehicle direction is reversed, the input switch contacts 34 and the reverse output switch contacts 36 become involved in the sequence of operation so that any charge on the supply capacitor 40 is dissipated by way of the ground path back to the battery 14. Consequently, the control capacitor 24 does not receive any charge and the relay 18 either remains deenergized or deenergizes if vehicle movement had changed from forward to reverse. Therefore, the red signal lamps 10R and 12R are illuminated.

From the foregoing it will be appreciated that a vehicle signaling system is provided in which the motion of the vehicle is quickly monitored and the direction is discerned so that during forward movement green signal lamps are illuminated and during reverse movement red signal lamps are illuminated. This system further provides for illuminating the red signal lamps when a turn is indicated or the brakes are applied. The motion switch 26 is easily connected to the power train to respond to direction of vehicle movement, and with simple circuitry and mechanical structure develops an output for operating the relay 18 when forward rotation commences and no output when reverse movement occurs.

It should be understood that the motion switch 26, because of its advantageous features, is not restricted in its use to the described vehicle signaling system, but can be adapted for use in many other systems as those versed in the art will appreciate. Exemplary are the systems disclosed in United States application Ser. No. 646,017 for Vehicle Signaling Systems, filed June 14, 1967.

What is claimed is:

1. A vehicle signaling system comprising first and second signaling lamps mounted on the vehicle; the first signaling lamp providing an indication of forward vehicle movement and the second signaling lamp providing an indication of no forward vehicle movement; a source of electric energy; and a control circuit for the signaling lamps; the control circuit including relay means operative to connect to the source and thereby illuminate either the first or the second lamp, control electric energy storage means operative when charged to actuate the relay means so as to cause the first lamp to be illuminated and when discharged to actuate the relay means so as to cause the second lamp to be illuminated, and switch means responsive to vehicle movement, the switch means including supply electric energy storage means and being repeatedly operative upon forward vehicle movement to alternately connect the source to the supply electric energy storage means and connect the supply electric energy storage means to the control electric energy storage means so as to charge the control electric energy storage means from the supply electric energy storage means and thereby actuate the relay means so as to illuminate the first lamp.

2. A vehicle signaling system comprising first and second signaling lamps mounted on the vehicle; the first signaling lamp providing an indication of forward vehicle movement and the second signaling lamp providing an indication of no forward vehicle movement; a source of electric energy; and a control circuit for the signaling lamps; the control circuit including relay means operative to connect to the source and thereby illuminate either the first or the second lamp, control electric energy storage means operative when charged to actuate the relay means so as to cause the first lamp to be illuminated and when discharged to actuate the relay means so as to cause the second lamp to be illuminated, and switch means driven in response to vehicle movement, the switch means including supply electric energy storage means and sequentially actuated means repeatedly operative during forward movement of the vehicle to alternately connect the source to the supply electric energy storage means and connect the supply electric energy storage means to the control electric energy storage means so as to charge the control electric energy storage means from the supply electric energy storage means and thereby actuate the relay means so as to illuminate the first lamp and during reverse movement of the vehicle to alternately connect the source to the supply electric energy storage means and shunt the supply electric energy storage means so as to discharge the electric energy therefrom before the electric energy can be supplied to the control electric energy storage means and thereby actuate the relay means so as to illuminate the second lamp.

3. A vehicle signaling system comprising first and second signaling lamps; the first signaling lamp providing one color of illumination and the second signaling lamp providing another color of illumination; a source of current; a control circuit for the signaling lamps; the control circuit including relay means operative to connect to the source and thereby illuminate either the first or the second lamp, a control capacitor in parallel with the relay means and operative when charged to actuate the relay means so as to cause the first lamp to be illuminated and when discharged to actuate the relay means so as to cause the second lamp to be illuminated, a supply capacitor, sequentially actuated means responsive to vehicle movement and repeatedly operative upon forward vehicle movement to alternately connect the source to the supply capacitor and the supply capacitor to the control capacitor so as to charge the control capacitor from the supply capacitor and thereby actuate the relay means so as to illuminate the first lamp and upon backward vehicle movement to alternately connect the source to the supply capacitor and shunt the supply capacitor so that the supply capacitor discharges and thereby actuate the relay means so as to illuminate the second lamp; and stop and turn signal responsive switch means operative to cause the relay means to be actuated so as to illuminate the second lamp when the vehicle is to be stopped or turned.

4. A vehicle signaling system comprising a red signal lamp and a green signal lamp both mounted on the vehicle; a source of current; and a control circuit for the signal lamps; the control circuit including relay means operative to connect to the source and thereby illuminate either the red signal lamp or the green signal lamp, a control capacitor in parallel with the relay means and operative when charged to energize the relay means so as to cause the green signal lamp to be illuminated and when discharged to deenergize the relay means so as to cause the red signal lamp to be illuminated, and switch means driven in response to vehicle movement, the switch means including a supply capacitor, a series of switch contacts, and a series of movable cam surfaces maneuvered at a frequency related to vehicle speed for repeatedly and sequentially actuating the series of switch contacts during forward vehicle movement to alternately connect the source to the supply capacitor and connect the supply capacitor in parallel with the control capacitor so as to charge the control capacitor and thereby energize the relay means so as to cause the green signal lamp to be illuminated and during backward vehicle movement to alternately connect the source to the supply capacitor and shunt the supply capacitor so as to discharge the supply capacitor and thereby deenergize the relay means so as to cause the red signal lamp to be illuminated.

5. A vehicle signaling system comprising a red signal lamp and a green signal lamp both mounted on the vehicle; a source of current; a control circuit for the signal lamps; the control circuit including relay means operative to connect to the source and thereby illuminate either the red signal lamp or the green signal lamp, a control capacitor in parallel with the relay means and operative when charged to energize the relay means so as to cause the green signal lamp to be illuminated and when discharged to deenergize the relay means so as to cause the red signal lamp to be illuminated, switch means driven in response to vehicle movement, the switch means including a supply capacitor, a series of switch contacts, and a series of revolvable cams driven at a speed proportional to vehicle speed for repeatedly and sequentially actuating the switch contacts during forward vehicle movement to alternately connect the source to the supply capacitor and connect the supply capacitor in parallel with the control capacitor so as to charge the control capacitor and thereby energize the relay means so as to cause the green signal lamp to be illuminated and during backward vehicle movement to alternately connect the source to the supply capacitor and shunt the supply capacitor so as to discharge the supply capacitor and thereby deenergize the relay means so as to cause the red signal lamp to be illuminated; a brake actuated switch operative to interrupt the control circuit when the brakes are applied so as to cause the relay means to be deenergized and the red signal lamp illuminated; and a turn signal operated switch operative to interrupt the control circuit when a turn is indicated so as to deenergize the relay means and cause the red signal lamp to be illuminated.

References Cited

UNITED STATES PATENTS

| | | | |
|---|---|---|---|
| 2,895,082 | 7/1959 | Suyetani | 340—72 X |
| 2,912,685 | 11/1959 | Thomas | 340—56 X |
| 3,120,655 | 2/1964 | Beason et al. | 340—271 |
| 3,213,417 | 10/1965 | Lewus | 350—67 |
| 3,214,731 | 10/1965 | Ballard | 340—70 |
| 3,315,227 | 4/1967 | Du Rocher | 340—82 |

JOHN W. CALDWELL, Primary Examiner

KENNETH N. LEIMER, Assistant Examiner

U.S. Cl. X.R.

340—70, 271